(12) United States Patent
Bonebakker et al.

(10) Patent No.: US 7,631,171 B2
(45) Date of Patent: Dec. 8, 2009

(54) METHOD AND APPARATUS FOR SUPPORTING VECTOR OPERATIONS ON A MULTI-THREADED MICROPROCESSOR

(75) Inventors: Jan L. Bonebakker, Mountain View, CA (US); Robert J. Kroeger, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 83 days.

(21) Appl. No.: 11/312,853

(22) Filed: Dec. 19, 2005

(65) Prior Publication Data

US 2007/0143574 A1    Jun. 21, 2007

(51) Int. Cl.
*G06F 9/44* (2006.01)
*G06F 9/30* (2006.01)
*G06F 9/455* (2006.01)

(52) U.S. Cl. .................. 712/227; 712/209; 703/26
(58) Field of Classification Search .......... 712/2–9, 712/227, 209; 703/26; 717/136, 138
See application file for complete search history.

(56) References Cited

U.S. PATENT DOCUMENTS

| | | | |
|---|---|---|---|
| 5,513,366 A * | 4/1996 | Agarwal et al. ............. 712/22 |
| 6,049,839 A * | 4/2000 | Fujii et al. ............. 710/1 |
| 2002/0174318 A1* | 11/2002 | Stuttard et al. ............. 712/13 |
| 2003/0120901 A1* | 6/2003 | Hokenek et al. ............. 712/215 |

OTHER PUBLICATIONS

Hironaka, T., Hashimoto, T., Okazaki, K., Murakami, K., and Tomita, S. 1992. Benchmarking a vector-processor prototype based on multithreaded streaming/FIFO vector (MSFV) architecture. In Proceedings of the 6th international Conference on Supercomputing (Washington D. C., Jul. 19-24, 1992). ICS '92. ACM Press, New York, NY, 272-281.*
Andrew S. Tanenbaum; Structured Computer Organization; Second Edition; 1984; Section 1.4 (pp. 10-12).*

* cited by examiner

*Primary Examiner*—Eddie P Chan
*Assistant Examiner*—William B Partridge
(74) *Attorney, Agent, or Firm*—Park, Vaughan & Fleming LLP

(57) ABSTRACT

One embodiment of the present invention provides a system that supports vector operations on a multi-threaded microprocessor. During operation, the system detects a vector instruction in a program. The system maps this vector instruction onto the thread contexts of the multi-threaded microprocessor. As part of the mapping process, the system splits the vector instruction across a set of threads that execute in parallel and generates a set of instructions for the set of threads. This mapping process allows the vector instruction to be executed efficiently across multiple threads.

18 Claims, 4 Drawing Sheets

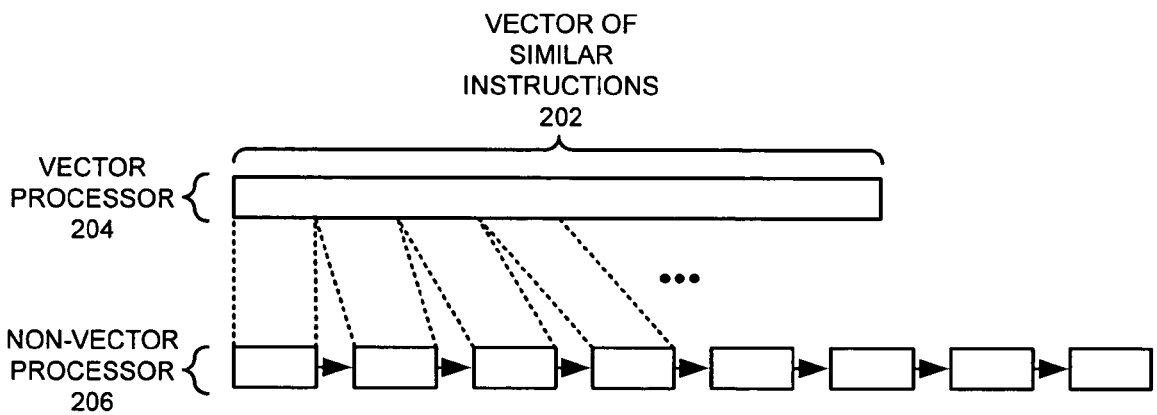
FIG. 1A
FIG. 1B
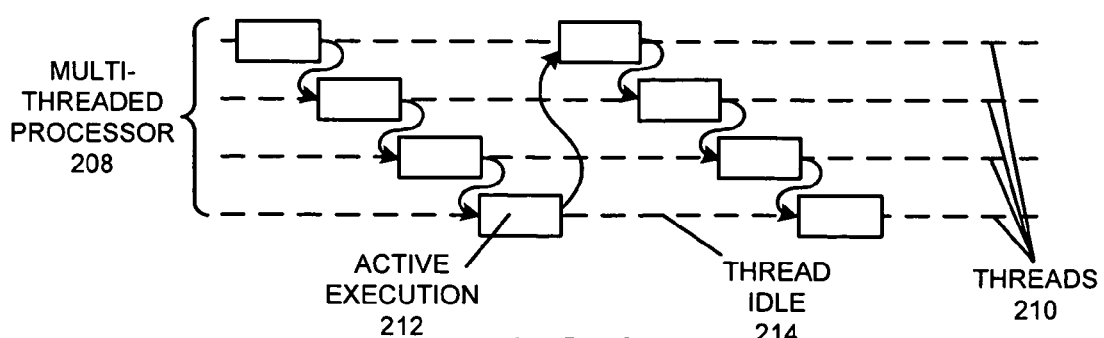
FIG. 2

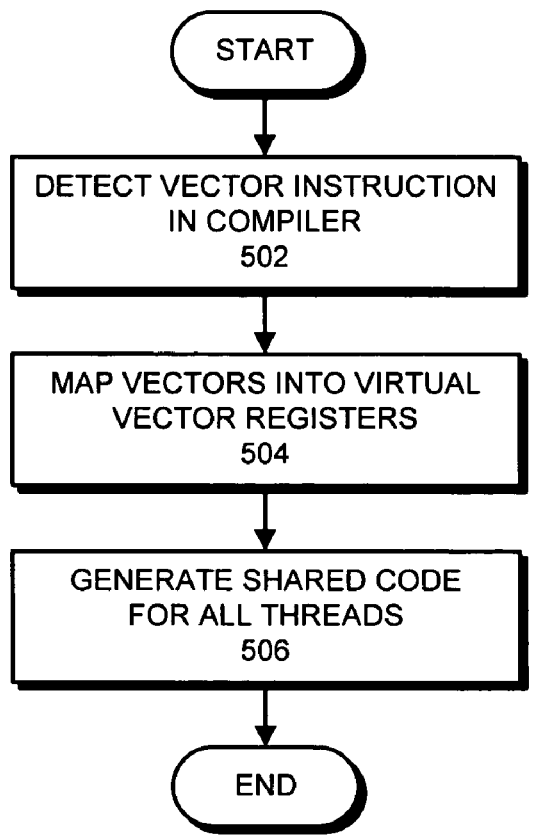
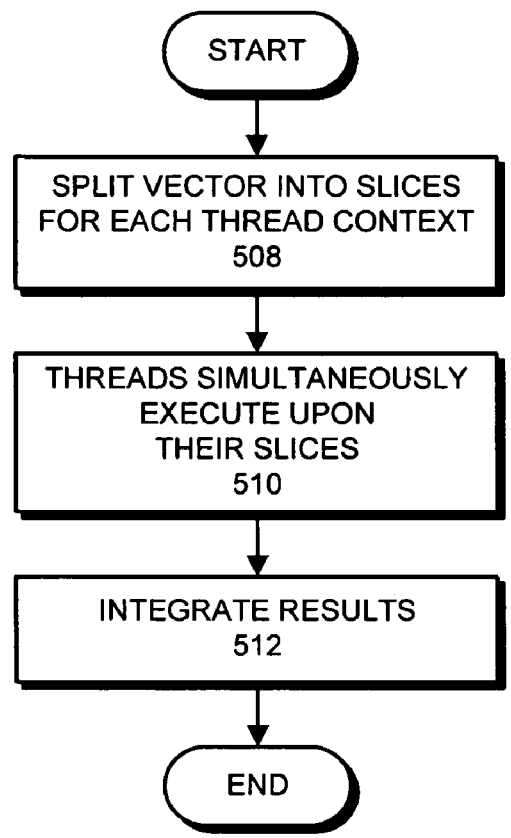
FIG. 5A     FIG. 5B

METHOD AND APPARATUS FOR SUPPORTING VECTOR OPERATIONS ON A MULTI-THREADED MICROPROCESSOR

BACKGROUND

1. Field of the Invention

The present invention generally relates to supporting virtual vector operations on a multi-threaded microprocessor. More specifically, the present invention relates to a technique for efficiently executing vector operations by mapping them across a set of threads that execute in parallel on the multi-threaded microprocessor.

2. Related Art

Vector processors are designed to improve computation for highly-parallel applications such as scientific computing. A vector instruction specifies an operation that will be repeated for an entire vector of independent data values, thereby essentially describing a large number of operations in a single instruction. Since a vector instruction executes the same operation on many independent pieces of data with known memory access patterns and no data hazards, a vector processor can leverage very deep pipelining to make such operations execute faster than on a non-vector processor.

The complexity and high cost of vector processors as well as advances in designs for pipelined multi-threaded processors have caused vector processors to be used less frequently. However, while the performance of multi-threaded microprocessors has improved dramatically, their lack of support for vector instructions makes exploiting parallel operations difficult in many situations. This is especially true for multi-threaded, multi-core processors, which include multiple, separate processors onto a single chip. These factors require programmers to create complex code for multiple threads in order to keep the processor busy, and have resulted in an increase in program complexity and programming difficulty.

Hence, what is needed is a method and an apparatus for supporting vector operations on a multi-threaded microprocessor.

SUMMARY

One embodiment of the present invention provides a system that supports vector operations on a multi-threaded microprocessor. During operation, the system detects a vector instruction in a program. The system maps this vector instruction onto the thread contexts of the multi-threaded microprocessor. As part of the mapping process, the system splits the vector instruction across a set of threads that execute in parallel and generates a set of instructions for the set of threads. This mapping process allows the vector instruction to be executed efficiently across multiple threads.

In a variation on this embodiment, the system supports a variable vector size by adjusting the number of threads upon which the vector instruction is mapped.

In a further variation, the system uses a variable vector size to execute multiple vector instructions simultaneously on different sets of threads on the processor cores of a multi-threaded, multi-core microprocessor.

In a further variation, multiple multi-threaded microprocessors are coupled together using a shared memory structure. This shared memory structure allows sets of threads from the multiple multi-threaded microprocessors to be combined virtually to create a larger variable vector size for vector instructions.

In a variation on this embodiment, all of the threads in the set of threads execute the same shared set of instructions but operate on different data, with each thread tracking its location in the shared set of instructions.

In a variation on this embodiment, the method is implemented in a compiler, a just-in-time compiler, a trap-handling system, an instruction emulation system, and/or a library.

In a variation on this embodiment, supporting vector operations on the multi-threaded microprocessor allows legacy vector program code to be efficiently executed on the multi-threaded microprocessor.

In a variation on this embodiment, supporting vector operations on the multi-threaded microprocessor simplifies the process of writing code for multi-threaded execution by allowing programs to be written in terms of vector operations.

BRIEF DESCRIPTION OF THE FIGURES

FIG. 1A illustrates a matrix-multiplication operation in accordance with an embodiment of the present invention.

FIG. 1B illustrates the vector instructions used for a matrix-multiplication operation in accordance with an embodiment of the present invention.

FIG. 2 illustrates execution of a vector operation on different processor architectures in accordance with an embodiment of the present invention.

FIG. 5A presents a flow chart illustrating the process of generating code for a vector instruction in accordance with an embodiment of the present invention.

FIG. 5B presents a flow chart illustrating the process of executing code for a vector instruction in accordance with an embodiment of the present invention.

DETAILED DESCRIPTION

Figure 3:
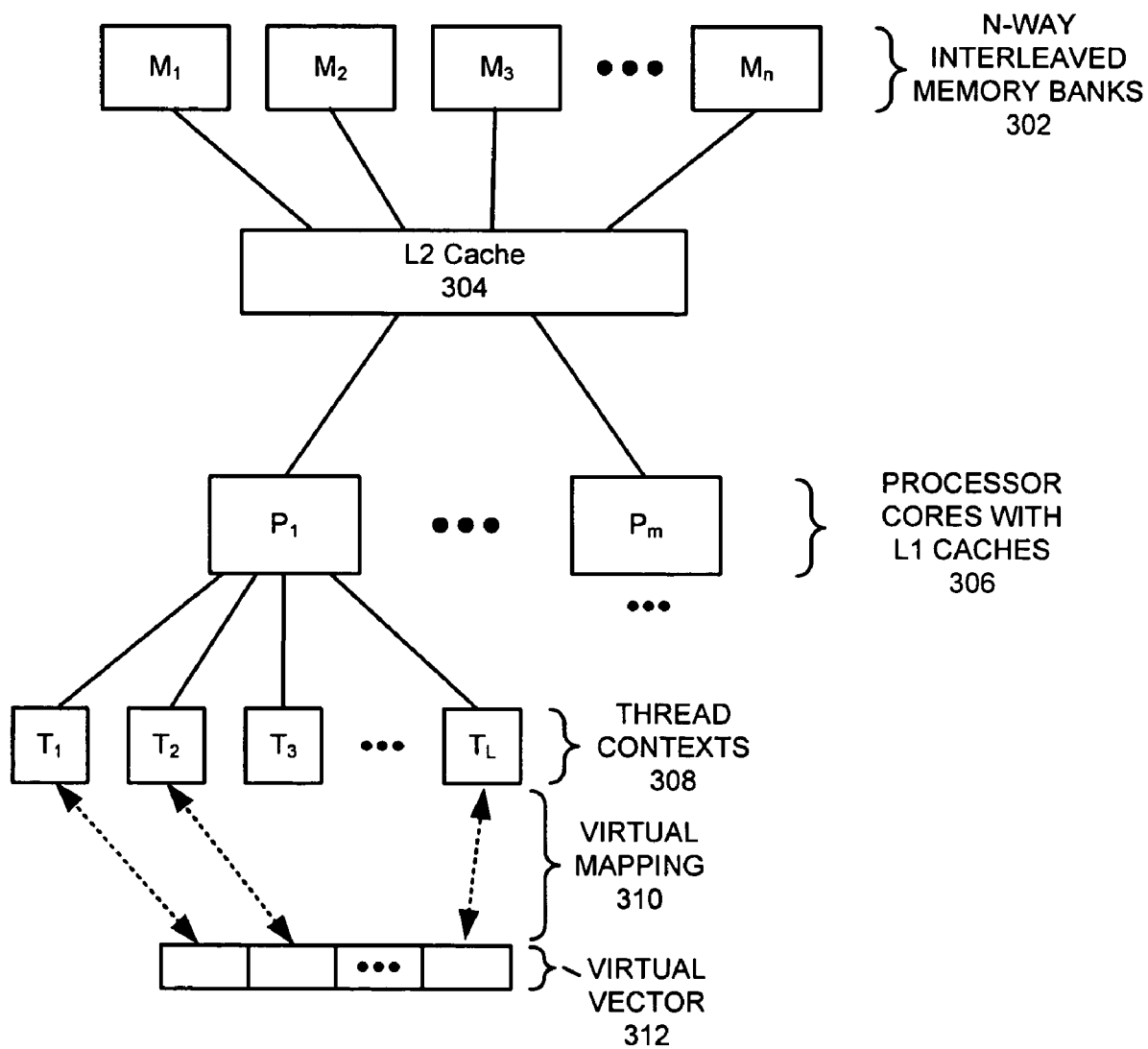
FIG. 3 illustrates the mapping of thread registers of a multi-threaded processor into a virtual vector in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Vector Operations

Vector processors can complete vector operations more rapidly than non-vector processors by exploiting deep pipelining and a reduced instruction fetch and decode phase. By describing an operation that can be executed sequentially upon entire vectors of arguments in a single instruction, the vector instruction facilitates fetching and issuing multiple instructions per clock tick without requiring multi-threading.

For example, FIG. 1A illustrates a sample vector operation, a matrix multiplication, on two small matrices, matrix A 102 and matrix B 104. The computation of each entry in the resulting matrix F 106 involves the multiplication of a row of matrix A 102 by a column of matrix B 104. For the element $F_1$, for instance, this involves computing the vector dot product of vector A 108 and vector B 110, which for the matrices shown involves three multiplication operations and a summation operation that combines the intermediate values.

FIG. 1B illustrates code generated by a vector matrix multiplication operation F=A×B. The compiler (e.g. a Fortran compiler) expands this single vector instruction into parallel vector sub-operations. For instance, in the code fragment shown, the two load operations in block 1 are independent, and can execute in parallel. While the values for the multiply operation in block 2 are dependent upon the values loaded in block 1, the first entries in the A and B vectors can already be multiplied in parallel with loading the subsequent entries. Similarly, the summation operation can begin as soon as the first two intermediate values have been computed.

An example of a vector supercomputer, the Cray-2, has eight vector registers each capable of storing 64 elements. The Cray-2 includes hardware operations to load vectors of data from memory and to execute vector operations such as dot product and sum. If a vector calculation fits into a vector register, the instruction can be executed efficiently across the entire vector. For instance, when operations (such as the multiply in matrix multiplication) are independent, the lack of data hazards and branches allow deep pipelining, and can facilitate generating one result per cycle. A benefit of this approach is that the floating point and load units can operate at nearly 100% utilization.

Vector performance depends upon the choice of a suitable vector size for the processor. Since the number of elements per register is typically fixed in a vector processor, the performance benefits are maximized when the system operates on vectors that approach the fixed vector size. Non-ideal vector sizes can lead to the "long vector/short vector problem," wherein shorter vectors operations cannot take full advantage of the hardware, while splitting longer vectors into multiple pieces causes a loss of efficiency.

Non-Vector Processors

Previous multi-threaded processors typically included neither vector registers nor nearly enough normal registers to perform vector operations. For a matrix multiplication operation, a non-vector processor must often loop for each successive calculation while keeping track of the intermediate results. Such looping results in lower performance, since the system cannot take advantage of deep pipelining.

Next-generation multi-threaded processors are richly provisioned with registers and threads. However, conventional programming approaches for such multi-threaded processors involve the hand-coding of many threads, which is tedious and complex. A system that facilitates programming a multi-threaded processor as a vector processor could potentially take advantage of natural parallelism in programs and could increase programmer productivity, since many programmers are familiar with vector operations, and it is easier to program many types of parallel applications using vector operations.

The present invention facilitates using processors that support multiple hardware threads to execute vector operations in parallel. In many situations, an inherently parallel calculation can be concisely specified in a single vector instruction which can then be split over a set of threads to generate the desired result as quickly as possible.

FIG. 2 illustrates the execution of a vector of instructions 202 on different processor architectures. For example, on a vector processor 204, after an initial startup phase the system outputs results continuously. Meanwhile, on a non-vector processor 206, the lack of registers and deep pipelining can result in loops and a longer cumulative execution time. For a multi-threaded processor 208, the instructions can be spread out across multiple threads 212. When an active thread 212 blocks on an operation and becomes idle 214, the system swaps in another thread that operates with its own set of data. This results in throughput which is potentially comparable to that of a vector processor.

Vector Operations on Non-Vector Processors

Modern multi-threaded processors can mimic vector processors by creating an abstraction that maps vector calculations to the registers of multiple hardware threads. In one embodiment of the present invention, multiple cores on a multi-threaded, multi-core processor can be harnessed to execute a vector instruction. For example, a software library can use one or more processor cores in the chip to implement an abstract vector processor. The library can also distribute operations from a single vector operation over the different hardware threads within each core.

FIG. 3 illustrates the mapping of a multi-threaded, multi-core processor's registers into a virtual vector 312. A shared L2 cache 304 loads data from a set of N-way interleaved memory banks 302. Processor cores with L1 caches 306 each support a set of threads with associated thread contexts 308. The registers in these thread contexts 308 are virtually mapped 310 into the virtual vector 312, with each thread context corresponding to a specific range of the vector.

One exemplary multi-threaded, multi-core processor has eight processor cores with four hardware threads each, for a total of 32 thread register contexts. Since each thread register context includes 32 floating point registers, a 64-element vector can be fit into eight thread contexts by using only eight registers in each context. These eight thread contexts can thus provide four 64-element virtual vector registers simultaneously.

A vector operation that comprises a single operation on a vector processor typically involves a multi-step operation on a multi-threaded processor. For example, FIG. 5A illustrates the process of generating code for a vector instruction. First, a vector instruction is detected by the compiler (step 502). The vectors of this instruction are then mapped into virtual registers (step 504) by allocating virtual registers from a pool of available registers. Next, the compiler expands the vector instruction into a single, carefully-arranged section of code that is shared by all of the participating threads and accounts for the mapping between real physical registers and virtual vector registers (step 506). Note that this is different from typical parallel computing, where the compiler generates a separate section of code for each thread. Note also that to facilitate such fine-grain sharing the operating system typically needs to relinquish significant control of the processor to the lightweight processes that support vector functionality.

FIG. 5B illustrates the process of executing code generated for a vector instruction. The code section is loaded into the L1 cache of the participating core(s). Since each thread context contains a separate set of registers, the threads can execute the same code but compute results for different slices of the vector (step 508). For instance, the registers of each thread's context include dynamically-generated addresses for loads, stores, and jumps which reflect the portion of the vector that the thread context is associated with. The use of shared code facilitates combining results while also reducing the number of L1 cache misses.

Figure 4:
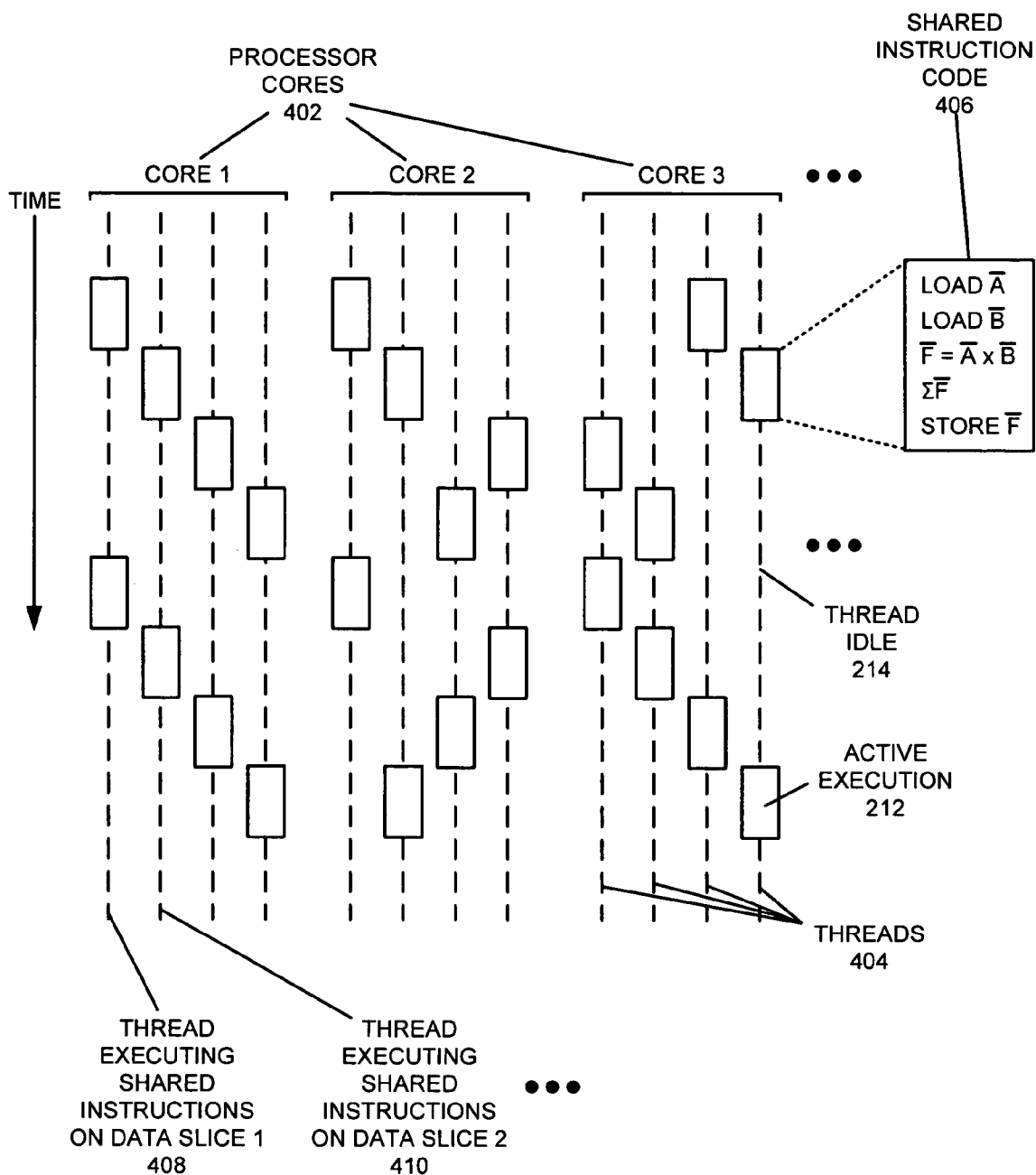
FIG. 4 illustrates hardware threads of a multi-core multi-threaded processor executing a vector instruction in accordance with an embodiment of the present invention.

The code-generation process essentially unrolls the program code for each thread context. For example, FIG. 4 illustrates hardware threads 404 executing a vector instruction on a multi-threaded processor with multiple processor cores 402. These threads simultaneously load data slices (e.g. 408, 410) using their assigned register values (e.g. a set of eight individual loads from a thread-specific location) and then proceed to execute the rest of the shared instruction code 406 (step 510). Because of thread variation, threads may not take the same path through the code, and some threads may block other threads. However, exact execution order is not important since many of the operations are independent across different sections of the vector. At the end of the process, the threads use thread-specific jump addresses to jump to the instructions that combine the intermediate values into a desired result and store the desired result in the shared L2 cache (step 512). While one thread integrates the results of one vector instruction, another set of threads can already continue with the next part of the loop or a new set of vector instructions.

Although multi-threaded execution of vector instructions introduces some overhead and performance degradation, modern multi-threaded processors can execute vector code efficiently by pipelining across threads. Large register sets facilitate parallel load and multiplication, thereby keeping the floating-point unit fully occupied for time durations comparable to those of vector processors. Simultaneous load operations can result in conflict, depending for instance on the system memory stride, but such bottlenecks can be averted, for instance by using multiple memory banks.

Virtual vector instructions allow large libraries of existing hand-written vector code to be leveraged. Since compilation and front-end specifications already exist for this vector code, the vector code can easily be re-mapped to the new multi-threaded architectures. This can be accomplished by modifying the code produced by a compiler back-end. Alternatively, such vector operations can also be re-mapped by a just-in-time compiler, a software library, an instruction emulation system, or a trap handler that traps specially-crafted instructions.

Variable-Sized Vectors

An additional benefit of virtualizing parallel instructions on a multi-threaded processor is that vector sizes can vary, thereby allowing the system to select the number of thread contexts and registers used for a vector computation to optimize performance. Variable vector sizes also facilitate executing multiple simultaneous vector operations with different vector lengths, as opposed to vector processors, which are bound to a fixed register size. Furthermore, variable virtual vector lengths allow idle thread contexts to begin work on queued vector instructions, resulting in higher floating-point unit utilization.

Vector sizes can be further extended by combining the thread contexts of multiple microprocessors into virtual vectors. For instance, on the multi-core microprocessor described previously, the virtual mapping across the registers is enabled by a shared L2 cache in which the results computed by the cores are integrated. As long as the memory hierarchy supports an efficient way of integrating results, this virtual vector approach is not limited to a single processor. For instance, the system can use an off-chip shared L3 cache to integrate results from an even larger virtual vector that spans the registers of multiple microprocessors.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for supporting vector operations on a non-vector multi-threaded microprocessor, comprising:
while executing a program, detecting a vector instruction in the program; and
mapping the vector instruction onto the non-vector multi-threaded microprocessor, wherein the non-vector multi-threaded microprocessor does not include vector registers or enough processor registers to enable performing an operation on a vector of arguments in a single instruction;
wherein mapping the vector instruction comprises using at least one of a just-in-time compiler, a trap-handling system, an instruction emulation system, or a library to distribute one or more sub-operations from the vector instruction across a set of threads, within one or more processor cores, that execute in parallel in different thread contexts on the non-vector multi-threaded microprocessor and generating a set of instructions for the set of threads from the sub-operations.

2. The method of claim 1, wherein mapping the vector instruction comprises adjusting the number of threads across which the vector instruction is mapped to provide a variable vector size.

3. The method of claim 2, wherein variable vector size allows multiple vector instructions to execute simultaneously on different sets of threads which execute concurrently on different processor cores within a non-vector multi-threaded, multi-core microprocessor.

4. The method of claim 3,
wherein multiple non-vector multi-threaded microprocessors are coupled together by a shared memory structure; and
wherein sets of threads from the multiple non-vector multi-threaded microprocessors can be combined virtually to create a larger variable vector size for vector instructions.

5. The method of claim 1,
wherein all of the threads in the set of threads execute the same shared set of instructions but operate on different data; and
wherein each thread tracks where it is currently executing in the shared set of instructions.

6. The method of claim 1, wherein supporting vector operations on the non-vector multi-threaded microprocessor allows legacy vector program code to be executed on the non-vector multi-threaded microprocessor.

7. The method of claim 1, wherein supporting vector operations on the non-vector multi-threaded microprocessor allows programs to be written in terms of vector operations.

8. A computer-readable storage medium storing instructions that when executed by a computer cause the computer to perform a method for supporting vector operations on a non-vector multi-threaded microprocessor the method comprising:
while executing a program, detecting a vector instruction in the program; and
mapping the vector instruction onto the non-vector multi-threaded microprocessor, wherein the non-vector multithreaded microprocessor does not include vector registers or enough processor registers to enable performing an operation on a vector of arguments in a single instruction;

wherein mapping the vector instruction comprises using at least one of a just-in-tune compiler, a trap-handling system, an instruction emulation system, or a library to distribute one or more sub-operations from the vector instruction across a set of threads, within one or more processor cores, that execute in parallel in different thread contexts on the non-vector multi-threaded microprocessor and generating a set of instructions for the set of threads from the sub-operations.

9. The computer-readable storage medium of claim 8, wherein mapping the vector instruction comprises adjusting the number of threads across which the vector instruction is mapped to provide a variable vector size.

10. The computer-readable storage medium of claim 9, wherein variable vector size allows multiple vector instructions to execute simultaneously on different sets of threads which execute concurrently on different processor cores within a non-vector multi-threaded, multi-core microprocessor.

11. The computer-readable storage medium of claim 10, wherein multiple non-vector multi-threaded microprocessors are coupled together by a shared memory structure; and wherein sets of threads from the multiple non-vector multi-threaded microprocessors can be combined virtually to create a larger variable vector size for vector instructions.

12. The computer-readable storage medium of claim 8, wherein all of the threads in the set of threads execute the same shared set of instructions but operate on different data; and wherein each thread tracks where it is currently executing in the shared set of microprocessor instructions.

13. The computer-readable storage medium of claim 8, wherein supporting vector operations on the non-vector multi-threaded microprocessor allows legacy vector program code to be executed on the non-vector multi-threaded microprocessor.

14. The computer-readable storage medium of claim 8, wherein supporting vector operations on the non-vector multi-threaded microprocessor allows such programs to be written in terms of vector operations.

15. An apparatus for supporting vector operations on a non-vector multi-threaded microprocessor comprising:

a detection mechanism configured to detect a vector instruction in a program while executing the program; and a mapping mechanism configured to map the vector instruction onto the multi-threaded microprocessor, wherein the non-vector multi-threaded microprocessor does not include vector registers or enough processor registers to enable performing an operation on a vector of arguments in a single instruction;

wherein mapping the vector instruction comprises using at least one of a just-in-time compiler, a trap-handling system, an instruction emulation system, or a library to distribute one or more sub-operations from the vector instruction across a set of threads, within one or more processor cores, that execute in parallel in different thread contexts on the non-vector multi-threaded microprocessor and generating a set of instructions for the set of threads from the sub-operations.

16. The apparatus of claim 15, wherein mapping the vector instruction comprises adjusting the number of threads across which the vector instruction is mapped to provide a variable vector size.

17. The apparatus of claim 16, wherein variable vector size allows multiple vector instructions to execute simultaneously on different sets of threads which execute concurrently on different processor cores within a non-vector multi-threaded, multi-core microprocessor.

18. The apparatus of claim 17, wherein multiple non-vector multi-threaded microprocessors are coupled together by a shared memory structure; and wherein sets of threads from the multiple non-vector multi-threaded microprocessors can be combined virtually to create a larger variable vector size for vector instructions.

* * * * *